US005284711A

United States Patent [19]

Ihara

[11] Patent Number: 5,284,711

[45] Date of Patent: Feb. 8, 1994

[54] METHOD FOR FORMING A FLUORORESIN FILM AND ARTICLES HAVING A FLUORORESIN FILM FORMED BY THE METHOD

[75] Inventor: Keisuke Ihara, Yokohama, Japan

[73] Assignee: Bridgestone Corporation, Tokyo, Japan

[21] Appl. No.: 914,522

[22] Filed: Jul. 17, 1992

[30] Foreign Application Priority Data

Jul. 19, 1991 [JP] Japan ................................. 3-203402

[51] Int. Cl.$^5$ ............................................. B32B 15/08

[52] U.S. Cl. ...................................... 428/421; 205/96; 205/196; 205/227; 428/463; 428/469

[58] Field of Search ....................... 428/421, 463, 469; 205/196, 227, 96

[56] References Cited

U.S. PATENT DOCUMENTS 3,773,544 11/1973 Newton et al. ................ 428/421 X 5,106,682 4/1992 Matsushita et al. ............ 428/421 X

*Primary Examiner*—Thomas J. Herbert, Jr.

*Attorney, Agent, or Firm*—Sughrue, Mion, Zinn, Macpeak & Seas

[57] ABSTRACT

A method for forming a fluororesin film on a metallic substrate is described, which method comprising forming a chromium oxide film on at least one side of a metallic substrate and then forming a fluororesin film on the chromium oxide film. By this, good adhesion of the fluororesin film to the substrate is ensured. Further, when the fluororesin film is degraded, the film is readily removed without damaging the substrate and a fresh fluororesin film can be again formed on the substrate through a fresh chromium oxide film so that the substrate keeps it original dimensional precision and may be used semi-permanently.

10 Claims, 1 Drawing Sheet

METHOD FOR FORMING A FLUORORESIN FILM AND ARTICLES HAVING A FLUORORESIN FILM FORMED BY THE METHOD

BACKGROUND OF THE INVENTION

1. Field of the Invention

This invention relates to a method for forming a fluororesin film which has good adhesiveness and durability and wherein when a once-formed film is removed rom a substrate and a fresh one is again formed on the substrate, the re-information is feasible without damaging the substrate. The invention also relates to articles on which a fluororesin film is formed by the method.

2. Description of the Prior Art

Film formation, on metal substrate surfaces, of fluorocarbon resins or fluororesins such as polytetrafluoroethylene (PTFE), tetrafluoroethylene/hexafluoropropylene copolymers (FEP), tetrafluoroethylene/perfluoroalkyl vinyl ether copolymers and the like has been widely made on from domestic to various industrial articles in order to impart thereto non-tackiness, lubricity and corrosion resistance.

These fluororesin film cannot be formed on metal substrates in good adhesion according to ordinary coating techniques. In order to form fluororesin films on the surface of metal substrates, usual practice includes a procedure which comprises roughening the substrate surface such as by sand blasting, washing the roughened surface, applying and baking a primer so as to ensure good adhesion between the substrate surface and a fluororesin, optionally applying an intermediate coating on the primer, and finally applying and baking a finish coating of the fluororesin.

However, the fluororesin film formed by the method set out above usually consists of three or more layers including the primer layer, the intermediate layer and the finish layer. Accordingly, the total thickness of the film becomes great, which will in some cases lead to a lowering of the dimensional accuracy of the substrate.

Since the fluororesin has good non-adhesiveness and good lubricant property, the adhesion to the substrate is not always satisfactory when the film is formed by the above-stated method. This presents not only the problem that the film is disadvantageously apt to be separated during use, but also the problem that the hardness is not so high and the film is liable to suffer abrasion.

In case where the fluororesin film is degraded owing to the separation or abrasion, the degraded film is removed from the substrate. This may require re-formation of a fresh film. To this end, there is known a method wherein a once formed film is, for example, physically removed such as by sand blasting and a fresh film is again formed on the removed surface. The removal of the film by the physical method inevitably damages the substrate surfaces, with the possibility that the substrate is not used in industrial articles requiring a fine dimensional accuracy such as, for example, molds.

SUMMARY OF THE INVENTION

It is accordingly an object of the present invention to provide a method for forming a fluororesin film on substrates in good adhesion wherein, if required, a once-formed film can be readily and completely removed from the substrate without damaging the substrate.

It is another object of the present invention to provide articles on which a fluororesin film has been formed by the above method.

In order to achieve the above objects, there is provided, according to the present invention, a method for forming a fluororesin film on a metal substrate which comprises forming a chromium oxide film on at least one side of the substrate and forming a fluororesin film on the chromium oxide film. Metallic articles on which a fluororesin film has been formed according to the above method are also within a scope of the invention.

The invention is based on the finding that fluororesins or fluorocarbon resins such as tetrafluoroethylene/hexafluoropropylene copolymers (FEP), tetrafluoroethylene/perfluoroalkyl vinyl ether copolymer (PFA), polytetrafluoroethylene and the like exhibit good adhesion to chromium oxide films which have been formed by electrolytic processes. The chromium oxide film is readily formed on the surface of metal substrates in good adhesion. Thus, we have found that when a chromium oxide film is formed on a substrate surface and is coated with a fluororesin as mentioned above, the fluororesin film can be formed in good adhesion. According to this method, it is unnecessary to subject the substrate surface to roughening treatment or to formation of primer and intermediate layers, so that the accuracy of the substrate is no lowered. Moreover, the fluororesin film is formed on the metal substrate surface through the chromium oxide film, ensuring good adhesion to the substrate surface. In addition, the chromium oxide film can be readily, completely removed by washing with acids, so that the fluororesin film can be removed without damaging the substrate. If necessary, a fresh fluororesin film can be again formed on the surface by a similar manner. The invention is accomplished based on the above finding.

The reason why the fluororesin film is formed in good adhesion to the chromium oxide film is not clearly understood but is assumed as follows, although the present invention is not limited to the following theory. The fluororesin is subjected to coordinate bond with the chromium oxide film on baking. Depending on the type of film and the forming conditions, the chromium oxide film may be in a microporous surface condition or may be formed with microcracks in the surfaces thereof or may be stacked with fine particles. The fluororesin may be partially infiltrated into these recesses or interstices, showing an anchoring effect with a good influence on the adhesion with the fluororesin film.

BRIEF DESCRIPTION OF THE DRAWING

The sole FIGURE is a schematic, partially sectional view of a fluororesin film formed on a substrate surface according to the method of the invention.

DETAILED DESCRIPTION AND EMBODIMENTS OF THE INVENTION

Figure 1:
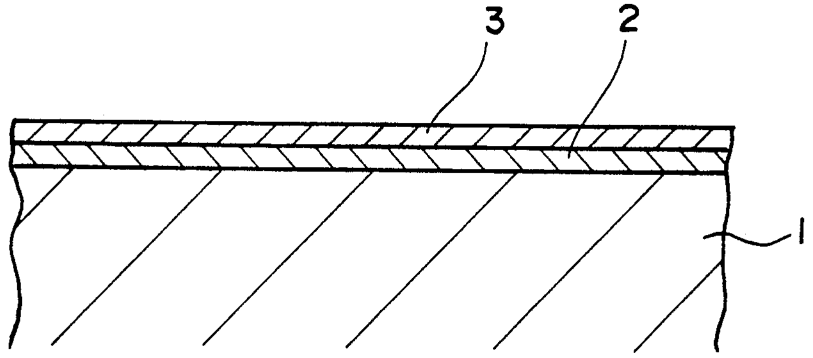

The present invention is described in detail with reference to the accompanying drawing.

In the sole FIGURE, there is schematically shown a metallic substrate 1 which has a chromium oxide film 2 on one side thereof and a fluororesin coating layer 3 on the chromium oxide film 2. The substrate 1 may be made of a variety of metals such as steel, copper, copper alloys, stainless steels, nickel, nickel alloys and the like.

The formation method of the fluororesin film according to the present invention is described. In the method, the metallic substrate 1 is first provided, on which the chromium oxide film 2 is formed. The chromium oxide film 2 can be formed by cathodic or cathodic and anodic treatment of a chromium compound solution. The cathodic treatment includes black chromium plating method or chromate film forming method by cathodic electrolysis. The cathodic and anodic treatment includes a method of effecting the chromium compound solution to reversible electrolysis with cathodic and anodic currents. Where the electrolytic procedures are performed, no limitation is placed on the pretreatment of the substrate 1 and the formation of an undercoat. Where a chromium oxide is formed on a steel or copper alloy substrate, it is preferred to form a nickel plating film on the substrate 1, on which the chromium oxide film is formed.

The bath composition used to form a chromium oxide film by cathodic electrolysis procedure including black chromium plating method or chromate film forming method is not critical and includes, for example, those compositions which comprise a chromium compound, a catalyst such as acetic acid, acetates, fluorides or urea, and an additive such as nitrates, barium slats and the like. More particularly, the following compositions may be exemplified although not limitative. The concentrations of the respective ingredients in the following compositions may be appropriately changed.

| | |
|---|---|
| Composition 1 | |
| Chromic acid ($CrO_3$) | 100-300 g/l |
| Nickel chloride ($NiCl_2.6H_2O$) | 10-30 g/l |
| Glacial acetic acid | 1-15 ml/l |
| Composition 2 | |
| Chromic acid ($CrO_3$) | 100-300 g/l |
| Ammonium vanadate | 10-30 g/l |
| Acetic acid | 1-15 ml/l |
| Composition 3 | |
| Chromic acid ($CrO_3$) | 200-300 g/l |
| Silicohydrofluoric acid | 0.1-3 ml/l |
| Barium carbonate | 1-20 g/l |
| Composition 4 | |
| Chromic acid ($CrO_3$) | 300-500 g/l |
| Sodium hydroxide | 40-120 g/l |
| Barium carbonate | 3-20 g/l |
| Sucrose | 0.5-8 g/l |
| Silicohydrofluoric acid | 0.5-5 ml/l |
| Composition 5 | |
| Bichromate | 30-100 g/l |
| Chromium sulfate | 0.2-3 g/l |
| Hydrofluoric acid | 0.05-0.5 g/l |

The conditions which are used to carry out the cathodic electrolysis using the above bath compositions are appropriately selected. The cathode current density is generally in the range of from 0.1 to 50 A/cm$^2$, preferably from 20 to 40 A/dm$^2$, and the bath temperature is in the range of from −10° to 25° C., preferably from 0° to 10° C.

The electrolytic solution used for the cathodic and anodic treatment may be ones which have an ordinary composition comprising a chromium compound, an acid such as sulfuric acid, and a catalyst such as fluorides. More particularly, an electrolyte having the following composition is favorably used.

| | |
|---|---|
| Chromic acid ($CrO_3$) | 150-350 g/l |
| Sulfuric acid | 300-500 g/l |
| Magnesium fluoride | 0.1-5 g/l |

In the procedure, anodic electrolysis and cathodic electrolysis are alternately conducted. Preferably, the current densities at the anode and cathode are, respectively, in the range of from 0.01 to 3 A/cm$^2$, under which the anodic and cathodic electrolysis are reversed in every time of 1 to 60 seconds. The bath temperature is preferably in the range of from 40° to 60° C.

The formation of chromium oxide by the cathodically electrolytic procedure enables one to form microcracks or a stacked layer of fine particles. It is preferred that by proper control of the electrolytic condition, such formation is created. With the cathodically and anodically electrolytic procedure, it is possible to form a chromium oxide film having a microporous structure by alternately repeating the anodic and cathodic electrolytic treatments of workpieces.

The chromium oxide film is not critical with respect to the thickness. The thickness is preferably in the range of from 0.01 to 10 μm, more preferably from 1 to 3 μm. If the thickness of the chromium oxide film is less than 0.01 μm, good adhesion to the fluororesin film may not be always obtained.

When the chromium oxide film is formed, the substrate is usually subjected to pretreatment. The pretreatment includes defatting of the substrate, washing with water and activating the washed substrate with an acid. Roughening treatments such as sand blasting are not necessarily required. Accordingly, the chromium oxide film can be formed without lowering in the surface precision of the substrate. It will be noted that the formation of the chromium oxide film is not limited to those set forth hereinabove, but the oxide film may be formed by spraying, PVD, CVD or the like.

Subsequently, a fluororesin is coated onto the chromium oxide film 2 to form the fluororesin coating layer 3. The fluororesins use d for this purpose are not critical and preferably include tetrafluoroethylene/hexafluoropropylene copolymers (FEP), tetrafluoroethylene/perfluoroalkyl vinyl ether copolymers (PFA), polytetrafluoroethylene (PTFE) and the like. These fluororesins in the form of powder or a dispersion are coated onto the chromium oxide film and then heated for baking thereby forming a fluororesin coating layer in good adhesion to the oxide film. The coating and baking conditions are those ordinarily used for fluororesin coatings. The thickness of the fluororesin coatings. The thickness of the fluororesin coating layer is not critical and may be appropriately determined depending on the purpose, although the thickness may be usually in the range of 1 to 30 μm, particularly 5 to 10 μm.

The fluororesin film formed according to the method of the invention is so fixedly adhered that the durability is good. If the fluororesin film is degraded, the film is removed by separation and a fresh film can readily be formed.

More particularly, when the fluororesin film is abraded, most of the uppermost fluororesin layer is removed such as by water jet, after which the chromium oxide film is removed by dissolution with an acid such as hydrochloric acid. Both films are thus chemically separated without damaging the substrate with the precision of the substrate being not lowered. Again, a fresh chromium oxide film and a fresh fluororesin film are formed. Thus, the fluororesin film can be re-formed readily without a lowering of the substrate precision.

The invention is more particularly described by way of examples, which should not be construed as limiting the invention.

EXAMPLE 1

A nickel substrate was subjected to treatments of the following steps (1) to (9) on the surface thereof, thereby forming a chromium oxide film by an cathodic electrolytic procedure.

(1) Defatting with a solvent
(2) Washing with water
(3) Defatting with an alkali
(4) Washing with water
(5) Activation with an acid
(6) Washing with water
(7) Formation of a chromium oxide film by cathodically electrolytic procedure
(8) Washing with water
(9) Drying (60° C., 30 minutes)

The chromium oxide film formation of step (7) was effected under the following conditions.

| | |
|---|---|
| Bath Composition | |
| Chromic acid ($CrO_3$) | 400 g/l |
| NR-10 (Ebara Ujilight Co., Ltd.) | 10 g/l |
| NR-20 (Ebara Ujilight Co., Ltd.) | 9 g/l |
| NR-30 (Ebara Ujilight Co., Ltd.) | 30 g/l |
| Zero Mist HT-2 (Ebara Ujilight Co., Ltd.) | 0.4 g/l |
| Cathodic Electrolytic Conditions | |
| Bath temperature | 18° C. |
| Cathode current density | 30 A/dm$^2$ |
| Plating time | 6 minutes |
| Film thickness | 1.5 μm |

the chromium oxide film formed on the substrate surface was in the form of a stacked layer of chromium oxide wherein microcracks were finely formed.

Thereafter, the substrate on which the chromium oxide film had been formed was preheated at 150° C. for 30 minutes, followed by spraying an FEP dispersion on the chromium oxide film by means of a spray gun and baking by heating at 380° C. for 1 hour to form an FET coating layer. The coating of the FET dispersion was repeated twice in total to form a 10 μm thick fluororesin film.

The thus formed fluororesin film had good adhesion to the substrate surface. Most of the uppermost fluororesin film was removed by a water jet, followed by immersion in a 35% hydrochloric acid solution for 3 hours to dissolving out the chromium oxide film. As a consequence, the chromium oxide film could be well and completely separated without damaging the substrate. A fresh fluororesin film could be again formed on the substrate surface according to the procedure set out above to readily re-form the film.

EXAMPLE 2

A chromium oxide film was formed on a nickel substrate surface as used in Example 1 according to the following steps (1) to (9) using cathodically and anodically electrolytic procedure.

(1) Defatting with a solvent
(2) Washing with water
(3) Defatting with an alkali
(4) Washing with water
(5) Activation with an acid
(6) Washing with water
(7) Formation of a chromium oxide film by cathodically and anodically electroditic procedure
(8) Washing with water
(9) Drying (60° C., 30 minutes)

The chromium oxide film formation of step (7) was effected under the following conditions.

| | |
|---|---|
| Bath Composition | |
| Chromic acid ($CrO_3$) | 250 g/l |
| Sulfuric acid | 450 g/l |
| Magnesium fluoride | 0.5 g/l |
| Electrolytic Conditions | |
| Bath temperature | 50° C. |
| Current density | 0.3 A/dm$^2$ for cathodic electrolysis and 0.3 A/dm$^2$ for anodic electrolysis were reversed every one minute |
| Plating time | 30 minutes |
| Film thickness | 0.3 μm |

The chromium oxide film formed on the substrate surface was one having high strength wherein micropores were finely formed.

The substrate on which the chromium oxide film had been formed was preheated at 150° C. for 30 minutes and coated with a PFA dispersion by spraying on the chromium film by means of a spray gun, followed by baking by heating at 400° C. for 1 hour to form a PFA coating layer. The coating of the PFA dispersion was repeated twice in total to form a 10 μm thick fluororesin film.

The thus formed fluororesin film had good adhesion to the substrate surface. The most of the uppermost fluororesin film was removed by a water jet and the substrate was immersed in a 35% hydrochloric acid solution for 3 hours to remove the chromium oxide film by dissolution. As a result, the chromium oxide layer could be completely removed without damaging the substrate. Thereafter, a fresh fluororesin film could be again formed on the substrate surface by repeating the above procedure to readily form the film.

As will be apparent from the foregoing description, the fluororesin film formed on metallic substrates according to the method of the invention exhibits good adhesion to the substrate as having good durability. Where the fluororesin film obtained according to the invention is degraded by abrasion, it can be readily removed and separated without damaging the substrate. If a fresh film is formed on the thus removed substrate, the substrate can be effectively utilized semi-permanently.

What is claimed is:

1. A method for forming a fluororesin film on a metallic substrate which comprises the steps of:

(A) forming a chromium oxide film on at least one side of a metallic substrate by alternatively effecting anodic and cathodic electrolytic treatments to the metallic substrate in the presence of a chromium compound solution containing 150 to 350 g/l of chromic acid, 300 to 500 g/l of sulfuric acid and a fluoride; and (B) forming a fluororesin film on the resulting chromium oxide film, whereby said fluororesin film is a fixed to the at least one side of the metallic substrate through the chromium oxide film.

2. A metallic article which comprises a metallic substrate and a fluororesin film formed through a chromium oxide film in a manner as defined in claim 1.

3. The method according to claim 1, wherein when said metallic substrate is made of steel or a copper alloy, and said metallic substrate is plated with nickel prior to the formation of the chromium oxide.

4. The method according to claim 1, wherein the anodic and cathodic electrolytic treatments are effected under conditions of a current density of 0.01 to 3 $A/dm^2$ at the anode and cathode, respectively, and a bath temperature of from 40° to 60° C. in such a way that the treatments are reversed in every time of 1 to 60 seconds.

5. The method according to claim 1, wherein the chromium oxide film is formed in a thickness of from 0.01 to 10 μm.

6. The method according to claim 1, further comprising removing said fluororesin film when degraded, and immersing the substrate in an acid solution to remove the chromium oxide film therefrom, and repeating the method of claim 1 to form a fresh fluororesin film on a fresh chromium oxide film on the substrate.

7. The method according to claim 1, wherein said fluororesin film is formed by coating a powder of a fluororesin on the resulting chromium oxide film and baking the coated powder.

8. The method according to claim 7, wherein the coating and baking steps are repeated twice.

9. The method according to claim 1, wherein said fluororesin film is formed by coating a dispersion of a fluororesin on the resulting chromium oxide film and baking the coated dispersion.

10. The method according to claim 9, wherein the coating and baking steps are repeated twice.

* * * * *